United States Patent [19]

Torpey

[11] E Re. 29,970

[45] Reissued Apr. 17, 1979

[54] WASTEWATER TREATMENT

[75] Inventor: Wilbur N. Torpey, Douglaston, N.Y.

[73] Assignee: Autotrol Corporation, Milwaukee, Wis.

[21] Appl. No.: 790,290

[22] Filed: Apr. 25, 1977

Related U.S. Patent Documents

Reissue of:

[64] Patent No.: 3,915,854
Issued: Oct. 28, 1975
Appl. No.: 466,290
Filed: May 2, 1974

U.S. Applications:

[63] Continuation of Ser. No. 351,200, Apr. 16, 1973, abandoned, and a continuation-in-part of Ser. No. 293,594, Sep. 29, 1972, Pat. No. 3,817,857.

[51] Int. Cl.[2] ..... C02C 1/04

[52] U.S. Cl. ..... 210/17; 210/7

[58] Field of Search ..... 210/3-8, 210/14, 15, 17, 150, 151, 195, 253

[56] References Cited

U.S. PATENT DOCUMENTS

| | | | |
|---|---|---|---|
| 3,266,786 | 8/1966 | Grimes et al. | 261/92 |
| 3,335,081 | 8/1967 | El-Naggar | 210/15 |
| 3,547,815 | 12/1970 | McWhirter | 210/7 |
| 3,557,954 | 1/1971 | Welch | 210/17 |
| 3,596,767 | 8/1971 | Antonie | 210/195 |
| 3,654,147 | 4/1972 | Levin et al. | 210/6 |
| 3,704,783 | 12/1972 | Antonie | 210/17 |

OTHER PUBLICATIONS

Antonie, "Three-Step Biological Treatment with the Bio-Disc Process," presented at the New York Water Pollution Control Association Meeting, Montauk, N.Y., Jun. 12-15, 1972.

*Primary Examiner*—Thomas G. Wyse
*Attorney, Agent, or Firm*—Quarles & Brady

[57] ABSTRACT

Method and apparatus for upgrading the capability of existing activated sludge and trickling filter wastewater treatment plants to remove carbonaceous and oxidize nitrogenous pollutants. A single stage biological treatment unit utilizing partially submerged, rotating contactors for the growth of organisms utilizing the carbonaceous and nitrogenous components of wastewater is disclosed. The single stage unit is interposed between the biological treatment unit and final clarifier of the existing plant. Moreover, the existing biological unit is converted to use as a holding tank to absorb fluctuations in flow rate and pollutant concentration and thereby making possible the supply of a constant flow of wastewater to the single unit, while the existing final clarifier is used for the purpose of separating the suspended solids in the effluent from the single stage unit.

6 Claims, 8 Drawing Figures

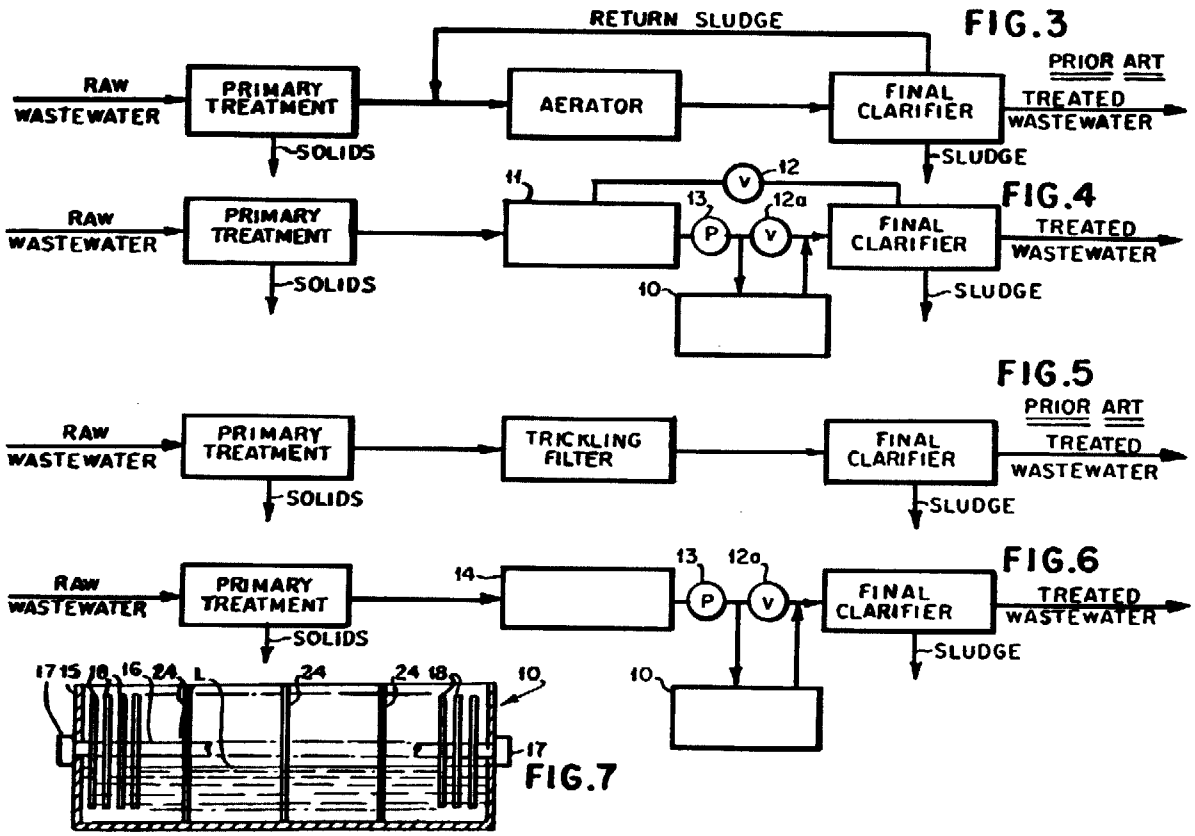
FIG.3
PRIOR ART
RAW WASTEWATER
PRIMARY TREATMENT
SOLIDS
AERATOR
RETURN SLUDGE
FINAL CLARIFIER
SLUDGE
TREATED WASTEWATER
FIG.4
RAW WASTEWATER
PRIMARY TREATMENT
SOLIDS
11
13
P
12
12a
V
10
FINAL CLARIFIER
SLUDGE
TREATED WASTEWATER
FIG.5
PRIOR ART
RAW WASTEWATER
PRIMARY TREATMENT
SOLIDS
TRICKLING FILTER
FINAL CLARIFIER
SLUDGE
TREATED WASTEWATER
FIG.6
RAW WASTEWATER
PRIMARY TREATMENT
SOLIDS
14
13
P
12a
V
10
FINAL CLARIFIER
SLUDGE
TREATED WASTEWATER
FIG.7
10
17
18
24
24
L
24a
16
18
15
17

WASTEWATER TREATMENT

Matter enclosed in heavy brackets [ ] appears in the original patent but forms no part of this reissue specification; matter printed in italics indicates the additions made by reissue.

RELATED APPLICATIONS

This application is a continuation of Ser. No. 351,200, filed Apr. 6, 1973, now abandoned; and a continuation-in-part of Ser. No. 293,594, filed Sept. 29, 1972, now U.S. Pat. No. 3,817,857.

BACKGROUND AND PRIOR ART

The invention pertains to the treatment of wastewater to remove and to biochemically modify carbonaceous and nitrogenous pollutants. More specifically, the invention provides method and apparatus adapted to upgrade existing secondary treatment wastewater plants in a manner to effect the maximum utilization of existing tankage and other related already paid for equipment.

Wastewater treatment plants currently in use typically include facilities for the removal of grit and screenables followed by sedimentation tanks for removing settleable and floating solids and secondary treatment tanks for the biological removal of carbonaceous matter from the wastewater. Secondary treatment of wastewater is accomplished by providing an environment conducive to the growth of attached biological slimes or activated flocs which utilize the pollutants in the usually presettled wastewater for their natural growth processes.

The secondary treatment of wastewater is accomplished by providing means for bringing the wastewater into contact with the attached slimes or activated flocs so as to supply nutrients and oxygen to the microorganisms. The surplus biological slimes or flocs are subsequently separated from the wastewater thus effecting the necessary clarification. The prerequisites for the effective bioextraction of pollutants from wastewater are, therefore, the continuous supply of nutrients necessary for the maintenance and growth of the microorganisms and oxygen adequate for their respiration. Secondary treatment processes currently in widespread use are known as the activated sludge and trickling filtration methods.

The secondary treatment method known as the activated sludge process, along with such variations as modified aeration and step aeration, has gained widespread use over the past several decades. This process provides for the aeration of the wastewater in the presence of a controlled amount of activated sludge floc relative to the amount of carbonaceous matter applied per unit of time. The microorganisms in the biological flocs extract the pollutants from the wastewater for their nutrition and are supplied with dissolved oxygen from the injection of diffused air into the aeration tank. Pollutants are removed from the wastewater by accretion onto the floc and by conversion into new organism growth which are subsequently separated from the wastewater by settling.

The standard rate or high rate trickling filtration processes provide for passing presettled wastewater over slimes grown on and attached to stationary surfaces. Clarification is effected by removal of carbonaceous matter through the activities of attached biological slimes that are subsequently separated from the clarified liquor.

A third, and very effective biological process for treating wastewater to oxidize carbonaceous matter, utilizes rotating biological contactors in the form of a plurality of closely spaced, partially submerged bodies, on which grow attached biological slimes. The rotating biological contactors can be in the form of thin discs, drums, cylinders, brushes, etc. The partially submerged bodies, are forcibly rotated to alternately expose the organisms on the contact surfaces to the atmosphere for the absorption of oxygen and the wastewater for nutrients.

Representative wastewater treatment systems utilizing a multistage configuration of partially submerged rotating biological contactors for the sequential treatment of wastewater are shown and described in Torpey U.S. Pat. No. 3,575,849; El Naggar U.S. Pat. No. 3,335,081; Simpson U.S. Pat. No. 3,455,241; and Hartmann et al. U.S. Pat. No. 3,389,798.

By a wide margin the vast majority of secondary treatment plants presently in use today are of the activated sludge and trickling filtration type. Although secondary treatment by rotating biological contactors has been shown to be very effective, various technical and economic factors have prevented their widespread utilization. One of the significant factors inhibiting the widespread use of rotating disc secondary treatment plants, is the existing tremendous capital investment already made in activated sludge and trickling filtration plants.

Prior art wastewater treatment systems are primarily concerned with removing carbonaceous pollutants from the wastewater and secondarily with the oxidation or removal of other materials such as soluble nitrogenous compounds, e.g. ammonia and nitrates. Recently, increased attention has been given to the presence of ammonia-nitrogen in receiving waters, particularly where potable water supplies are involved.

The nitrogenous matter in normal wastewater typically comprises a large fraction of ammonia, a smaller fraction of albuminoid nitrogen, and proteinaceous matter. The proteinaceous matter in wastewater exists in particulate form and is removed through coagulation and sedimentation. The ammonia-nitrogen content of normal domestic wastewater is usually from about 20 to about 35 mg/liter.

Processes for removing ammonia-nitrogen from wastewater follow two general lines of approach: (1) the physio-chemical, and (2) the biological. Physio-chemical processes generally have the basic disadvantage of being costly, producing undesirable side effects, generating a concentrated brine for disposal, and in some cases, polluting the air with ammonia vapors. The biological processes on the other hand, promote the natural cyling of nitrogen, i.e., oxidation of the ammonia and denitrification of the resulting nitrates to nitrogen gas.

It is a primary objective of the invention to provide a process and related apparatus for the effective removal of carbonaceous matter and the oxidation of nitrogeneous pollutants in normal domestic wastewater. A further objective of the invention is to provide a method for integrating a process of the foregoing type into existing activated sludge and trickling filtration treatment plants in such a manner as to utilize the available tankage and other existing capital equipment to a maximum extent. Additional objectives of the invention will become apparent as the description proceeds.

SUMMARY OF THE INVENTION

The foregoing and other objectives are accomplished by providing a process and apparatus for simultaneously oxidizing carbonaceous matter and ammonia in wastewater. The new process utilizes partially submerged rotating biological contactors such as discs, arranged in a single treatment stage and supplied with wastewater within a specific range of loading rate with respect to the surface area of the contactors (gallons per day per square foot).

Pursuant to the invention, the rate of wastewater applied substantially equally over the surface of the contactor per unit of time is reduced to a range wherein the residual concentrations of carbonaceous matter at the slime-wastewater interface is so low that the fast growing organisms using carbonaceous nutrients as an energy source are relatively starved. When this environment is created, the slow-growing organisms using ammonia for their nutrition develop and compete successfully with the fast growing organisms using carbonaceous matter. Thus, the fast reaction involving the oxidation of carbonaceous matter is reduced towards the rate of the slower reaction involving the oxidation of nitrogenous matter in a manner that both reactions are forced to proceed simultaneously. Accordingly, by utilizing a single stage of treatment and by control of the rate of feeding of wastewater to the slimes, the same surface is used to support both carbon and nitrogen utilzing organisms for their nutrition. The surface requirements for the critically loaded single stage unit has been shown to be determined by the nitrogenous oxidation requirements and as such, no added surface need be supplied for the oxidation of carbonaceous matter. The novel application of this efficient process to an existing plant is the primary objective of the invention.

The oxidation of ammonia-nitrogen is carried out by specific organisms forming attached slimes whose efficiency is rate-limited by their metabolism. That is to say, since the rate of diffusion of ammonia into the slimes is faster than their metabolic rate, the reaction rates are essentially independent of the concentration of ammonia at the slime-wastewater interface. Accordingly, the amount of ammonia oxidized, at a given temperature, depends on the amount of active organisms occupying a given surface over a span of real time, not time spent in the treatment unit. As a result, when the rate of flow of wastewater increases in accord with the diurnal pattern, an increased concentration of ammonia-nitrogen appears in the effluent. To accomplish a high degree of ammonia removal continuously, a holding tank should be provided after primary treatment that is large enough to absorb or dampen the flow and pollutant concentration surges entering the plant.

The diameter of the partially submerged rotatable surfaces is normally in the range of 10 to 12 feet. The slime supporting contactors are rotated so that the peripheral velocity is in the range of about 0.5 to 1.0 ft/sec. and the spacing between adjacent surfaces is in the range of three-eighths to 1 inch. A considerable advantage can be gained by making the single stage unit adaptable to long-term changes in flow rate by dividing the unit into four sections capable of being operated as one, two, three or four sections, as needed, all fed in parallel.

Pursuant to a further aspect of the invention, the aforementioned single stage biological contactor treatment unit is integrated into existing activated sludge and trickling filter secondary treatment plants to utilize existing capital equipment to a maximum degree. In this regard, the aeration tankage of an activated sludge or the tankage housing the media upon which the slimes grow in a trickling filtration plant is converted for use as a holding tank to store and mix the presettled wastewater during peak flow periods in a manner to be able to supply a substantially constant flow of wastewater with dampened variations in pollutant concentrations to the single stage biological contactor unit of the invention. The dampened variations in pollutant concentration result from the mixture in the holding tank of wastewater supplied at different times during the daily time cycle. The new single stage unit is interposed between the existing secondary treatment unit of an activated sludge or trickling filtration plant and the existing final clarifier such as a settling tank.

This arrangement utilizes to full advantage the existing expensive tankage of secondary treatment plants in such manner that the new single stage unit need only to be sized for average wastewater flow rates rather than for maximum rates as would be necessary if a flow equalizer tank to absorb diurnal variations in flow rate was not provided.

BRIEF DESCRIPTION OF THE DRAWINGS

The various aspects of the invention will be further explained with reference to the drawing in which:

FIG. 3 is a schematic flow diagram of an activated sludge wastewater treatment plant;

FIG. 4 is a schematic flow diagram of a process in accordance with the invention adapted for use in an activated sludge treatment plant;

FIG. 5 is a schematic flow diagram of a trickling filtration wastewater treatment plant;

FIG. 6 is a schematic flow diagram of a process in accordance with the invention adapted for use in a trickling filtration treatment plant;

FIG. 7 is a schematic elevational view taken along line 7—7 of FIG. 8;

DESCRIPTION OF PREFERRED EMBODIMENTS

Figure 1:
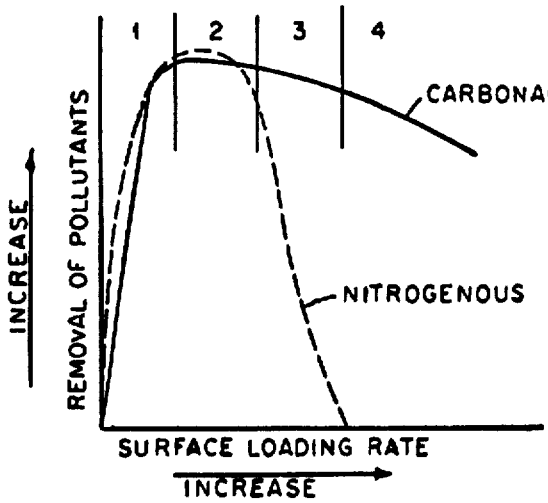
FIG. 1 is a pair of curves showing the effect of contactor surface loading rate on pollutant removal.

Referring to FIG. 1, the relationship of contactor surface loading rate to both carbonaceous removal and nitrogenous pollutant oxidation is shown in terms of four basic zones of biological activity.

Zone 1 embraces a transitory range of loading wherein varying degrees of starvation have been induced for both the organisms using Carbonaceous and nitrogenous matter.

Zone 2 defines a range of loading rates, wherein a preferred degree of starvation for organisms using carbonaceous matter has been induced, while the activity of organisms using nitrogenous matter is relatively unrestricted. The loading rates defined by Zone 2 is from about 0.4 to about 1.5 gallons per day per square foot of contactor surface.

Zone 3 represents a range of loading rates, wherein increases in the rate cause organisms using carbonaceous matter to increasingly dominate the environment, resulting in a rapid decrease in the rate of oxidation of nitrogenous matter.

Zone 4 defines a range of loading rates at which the concentration of carbonaceous matter at the slime-wastewater interface is sufficiently high to cause the organisms using carbonaceous matter to completely dominate the environment, thereby preventing the growth of nitrifying organisms.

Figure 2:
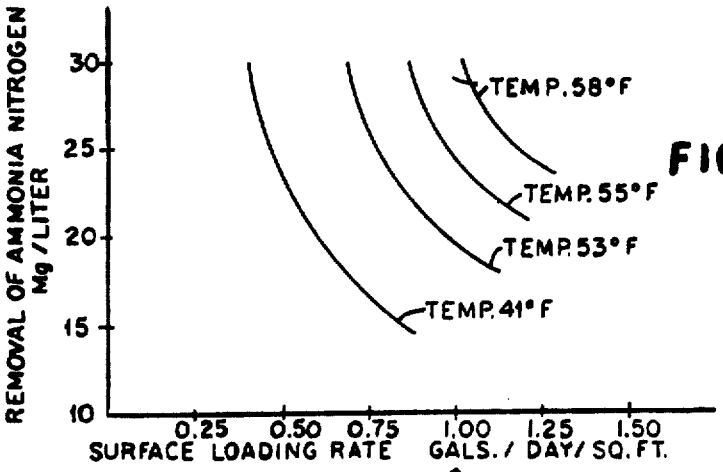
FIG. 2 is a series of curves showing the relationship of contactor surface loading rate to the mg/liter of ammonia removed from wastewater at various temperatures.

Referring now to FIG. 2, the relationship of ammonia removal by oxidation to contactor surface loading rate for various wastewater temperatures is shown.

The temperatures shown in FIG. 2 embrace the lower values of the range of wastewater temperatures encountered in most treatment plants. Because a treatment plant should be designed to treat the coldest water encountered, a selection of loading rate to conform to such minimum temperature should be made. For example, if it were desired to remove about 25 mg/liter of the ammonia-nitrogen from normal domestic wastewater using a single stage of treatment, the surface loading rate should be about 0.52 gal/day/sq.ft., if the minimum wastewater temperature expected was 41° F. At a minimum wastewater temperature of 58° F., the comparable loading rate should be about 1.25 gal/day/sq.ft.

As shown in FIG. 2, the slime growing surface requirement for a single stage unit to remove 90 percent of the carbonaceous and nitrogenous matter for a typical plant processing 1 million gal/day of normal wastewater having 25 mg/liter of ammonia at a temperature of 55° F. would be 1 gal/day/sq.ft. or 1,000,000 sq. ft. A conventional prior art treatment process using partially submerged rotatable biological contactors arranged for series or stage operation would require about 1,400,000 sq. ft. of surface for equivalent pollutant removal. Further, by the use of the single stage treatment unit, pursuant to the invention, a significantly large fraction of the nitrates formed are reduced to nitrogen gas, thus lowering the nitrogen concentration in the effluent without adding to the cost of treatment.

Pursuant to a specific aspect of the invention, a preferred contactor surface loading rate of from about 0.4 to about 1.5 gal/day/sq.ft. is defined; which rate results in the removal of the bulk of carbonaceous and the oxidation of the nitrogenous matter from the influent wastewater. The contactor surface loading rate is a function of the temperature of the wastewater being treated as shown in FIG. 2. In some cases, it might be desirable to operate with a contactor surface loading rate as high as 2.0 gal/day/sq.ft. if, for instance, the lowest anticipated wastewater temperature was above about 60° F. or if it was desired to oxidize a lesser amount of ammonia from the influent or if the wastewater concentration of nitrogenous matter is dilute. In further accordance with this specific aspect of the invention, contactor surface loading rates of 2 gal/day/sq.ft. or even higher can be used by increasing the oxygen content of the atmosphere above the wastewater surface in the single stage treatment unit. The atmosphere over the rotating contactors can be enclosed and enriched with oxygen to the extent that the resulting atmosphere contains up to about 60 percent by volume of oxygen, resulting in increased efficiency in oxidizing carbonaceous and nitrogenous material in the wastewater. A contactor surface loading rate from about 1 to about 2.5 gal/day/sq.ft. can be utilized when the atmosphere above the rotating contactors contains from about 30 to about 60 percent by volume of oxygen, coldest wastewater encountered, gal/day/sq.ft.

FIG. 3 schematically illustrates an activated sludge wastewater treatment plant. The plant shown in FIG. 3 includes primary treatment to remove settleable and floatable solids; an aerator for the biochemical removal of carbonaceous matter and a final clarifier for settling the activated sludge and having means for returning activated sludge.

According to a specific aspect of the invention, as illustrated in FIG. 4, an activated sludge plant is adapted to utilize a single stage treatment unit 10 employing rotatable partially submerged biological contactors for the simultaneous removal of carbonaceous and the oxidation of nitrogenous pollutants. Effluent from the primary treatment unit is supplied to the aeration tank of the activated sludge installation which, according to the invention is converted to function as a holding tank 11. The aerating means present in the aerating tank can be deactivated if desired and the return sludge line shut or removed by means of valve 12 or other appropriate means. The aerating means can be used to prevent settling of solids in the aeration tank. The return sludge facilities, although not necessary to the process, can be retained. Appropriate means should be provided in the holding tank 11 to insure the mixing of wastewater supplied at various times during the day so that variations in the carbonaceous and nitrogenous pollutant concentration can be dampened. Suitable means would be a pump for circulating effluent from the holding tank to its influent or a splitter box for supplying wastewater equally to all sections of the holding tank.

Means, typically a rate controller device or pump 13, is provided at the outlet of holding tank 11 to supply a relatively constant rate of wastewater to the single stage biological treatment unit 10. The supply of a relatively constant rate of wastewater flow is important to the effective and efficient operation of the advanced biological treatment unit 10. A suitable shut off means, such as valve 12a, is provided to direct wastewater from the tank 11 to biological treatment unit 10. Treated wastewater from biological treatment unit 10 is supplied to a final settling tank or other appropriate clarifying devices wherein sloughed-off biological forms are separated from the flow.

FIG. 5 schematically shows a wastewater treatment plant employing a trickling filter for secondary treatment of the presettled wastewater. The trickling filter unit consists of a large tank containing stationary surfaces over which the presettled wastewater is passed. The stationary surface is usually in the form of a plurality of individual units such as rocks or plastic media that are distributed throughout the tank with void spaces so that the biological slimes can absorb oxygen from the atmosphere. The wastewater passes through rotating nozzles over the surface of the tank so that all slimes which develop on the media are brought into contact with the wastewater during its downward flow path. A final clarifier such as settling tank is provided to remove from the wastewater, mature slimes that are sloughed off the stationary surfaces of the media.

According to a further specific aspect of the invention, as shown in FIG. 6, a trickling filter plant is adapted to utilize a single stage treatment unit 10 employing a single stage unit comprising rotatable partially submerged biological contactors for the simultaneous removal of carbonaceous and the oxidation of nitrogenous pollutants. Pursuant to this aspect of the invention, the trickling filter tank formerly used for biological treatment in the prior art plant is adapted to function as a holding tank 14 to absorb diurnal fluctuations in flow rate in the same manner as the aerator of the activated sludge plant of FIGS. 3 and 4. In this regard, it would be advantageous to remove the stationary surface media from the trickling filter unit and to retain the rotary flow distributor to aid in the mixing of the mixing tank 14 contents. A rate controller device 13 is added at the outlet of tank 14 to supply a relatively constant rate of wastewater to the single stage biological treatment unit 10. Shut off valve 12a and appropriate conduits are provided to direct wastewater from the tank 14 to the biological treatment unit 10. Treated wastewater from biological treatment unit 10 is supplied to a final clarifier such as settling tank or other appropriate clarifying devices wherein sloughed off biological forms are separated from the flow.

Figure 8:
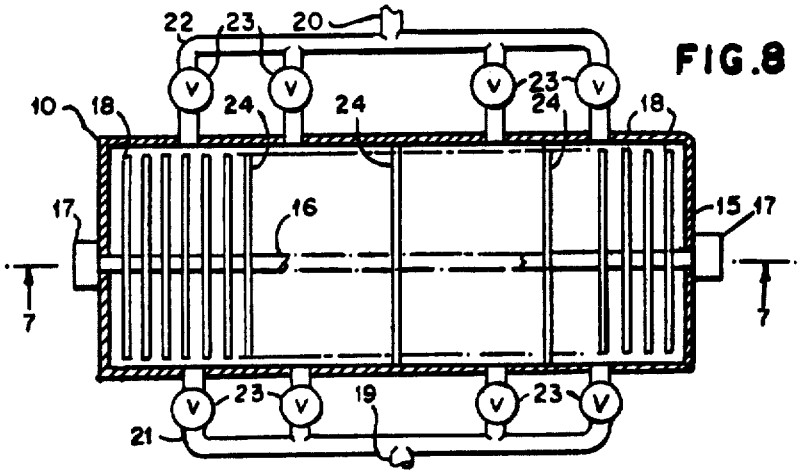
FIG. 8 is a schematic plan view showing the single stage biological treatment unit employing rotating biological contactors.

The single stage biological treatment unit 10 is shown schematically in further detail in FIGS. 7 and 8. The single stage biological treatment unit 10 includes a tank 15 of the same general configuration as the rotating surfaces below the longitudinally extending rotatable shaft 16. The rotatable shaft 16 is supported by appropriate bearing 17 and is rotated by an appropriate drive mechanism (not shown). Shaft 16 is preferably disposed above the wastewater level L. A plurality of biological contactors 18 are mounted on shaft 16 transverse to its axis and spaced along its length. The contactors 18 are typically from about 10 to about 12 feet in diameter; spaced about three-eighths to 1 inch apart and may extend into the wastewater contained by tank 15 from about one-third to two-thirds of their diameter. The contactors are rotated at a peripheral velocity of about 0.25 to about 1 ft./sec. to alternately supply the organisms growing thereon with atmospheric oxygen and nutrients. A preferred form of contactor has a honeycomb structure and is disclosed in pending U.S. patent application Ser. No. 252,038 filed May 10, 1972.

Wastewater is supplied to tank 15 by pipe 19 and treated effluent leaves through discharge pipe 20. Preferably, both the supply pipe 19 and discharge pipe 20 communicate with inlet and outlet manifold units 21 and 22, both equipped with valves 23, respectively. The manifold units 21 and 22 serve to distribute the wastewater along the length of the treatment unit, which, in addition to mixing within the tank accomplished by the moving surfaces, serves to feed all the slime surfaces substantially equally. Provision is made by the three tank separators 24 so that it can be operated as full volume or using one-fourth, one-half or three-fourths of the volume.

The following example further illustrates the process of the invention.

Table I (which appears on next page) shows the results of processing settled wastewater in a single stage biological treatment unit. The unit used was a half formed cylindrical tank with a radius of 5 feet 2 inches containing 5,240 sq. ft. of contactor surface. The contactors were in the form of thin discs, having a 10 foot diameter and spaced 0.8 inches apart. The discs were immersed in the wastewater 40 percent of their vertical diameter and were rotated at 1 R.P.M.

The data of Table I indicates that when operating a single stage rotating disc biological treatment unit with a loading rate of from 0.9 to 1.3 gal/day/sq.ft. of settled wastewater on the contactor surfaces, about 90 percent of the $B.O.D._5$ remaining after presettling was removed along with the simultaneous reduction of ammonia-nitrogen concentration from 30 to 16 mg/liter at 41° F. and from 30 to 2 mg/liter at 58° F. The same slimes were thus shown capable of oxidizing the carbonaceous and nitrogenous matter.

Additional important advantages are derived from the use of a single stage rotating disk biological treatment process having a loading rate controlled within the range defined by the invention. The slimes that develop on the contactor surfaces remain thin, that is below one-eighth inch and usually below one-sixteenth inch thickness which permits reduction of the spacing between adjacent contactors from a typical three-fourths inch to as low as three-eighths inch without undue loss of detention time necessary to remove about 90 percent of the carbonaceous matter measured in terms of $B.O.D._5$.

Further, in accordance with the invention, the peripheral velocity of the rotating contactors can be reduced from 1 ft./sec. toward 0.3 ft./sec. as the loading rate is decreased from 1.5 toward 0.4 gal/day/sq.ft. without lowering the dissolved oxygen in the wastewater below 20 percent of saturation. Such controlled decrease of the rotational velocity of the contactors provides a significant economic benefit by reducing the energy necessary to rotate the contactors, which varies directly with the cube of the rotational velocity. The invention further provides that when the contactor peripheral velocity is controlled between 0.3 to 1.0 ft./sec. as contactor loading rate is varied within the preferred range of 0.4 to 1.5 gal/day/sq.ft., denitrification can be forced as the organisms in the slimes use nitrate oxygen for their respiration. If the peripheral velocity of the contactors is too slow for the particular unit area loading rate of wastewater on the rotating surface, anaerobic conditions can develop. On the other hand, if the peripheral velocity of the rotating surfaces is too high, the conversion of nitrates to nitrogen gas will be reduced.

TABLE I

| | | | INFLUENT** | | | | EFFLUENT | |
|---|---|---|---|---|---|---|---|---|
| Flow Rate Gals/Day | Temp. ° F. | Disc Loading Rate Gals/Sq.Ft./Day | $B.O.D._5$* | $NH_3$—N Mg/l | $B.O.D._5$* Mg/l | $NH_3$—N Mg/l | $NO_3$—N Mg/l | Loss of N Mg/l |
| 4,500 | 41 | 0.9 | 125 | 30 | 21 | 16 | 4 | 10 |
| 6,800 | 42 | 1.3 | 131 | 25 | 15 | 13 | 6 | 6 |
| 5,900 | 46 | 1.1 | 129 | 25 | 14 | 13 | 8 | 5 |
| 6,000 | 53 | 1.1 | 121 | 28 | 12 | 9 | 13 | 6 |
| 5,600 | 58 | 1.1 | 109 | 30 | 15 | 2 | 17 | 11 |

*Biological oxygen demand, $B.O.D._5$ is a measure of the concentration of biodegradable organic carbon in a medium obtained by determining the amount of oxygen consumed (mg/l) by the medium at 68° F. in five days.

**Influent - presettled wastewater.

The new process will reduce the B.O.D.$_5$ in normal domestic wastewater from about 200 to 10 mg/liter and will oxidize ammonia-nitrogen according to surface loading rate. Moreover, a significantly large portion of the combined nitrogen is reduced to nitrogen gas which is evolved to the atmosphere. The remaining combined nitrogen, especially that in the form of nitrates, might require reduction at a lower level to meet new standards where potable water supplies are directly involved or to lessen the enrichment of the receiving water with nitrogen, which accelerates unwanted growth.

From the foregoing description it should be apparent that the invention provides a biological treatment unit of increased efficiency that simultaneously oxidizes both carbonaceous and nitrogenous wastewater pollutants. The new biological treatment unit can be integrated into existing activated sludge and trickling filter treatment plants in a manner to utilize existing tankage and auxiliary hardware, which represent the major captial investment for a wastewater treatment plant, while substantially upgrading the B.O.D. and ammonia-nitrogen oxidation capacity of the plant.

According to the invention, an activated sludge treatment plant which typically removes about 90 percent B.O.D.$_5$ and oxidizes a very small portion, if any, of the ammonia nitrogen to nitrate form can be upgraded to remove up to 95 percent of the B.O.D.$_5$ and oxidize substantially all of the ammonia nitrogen to nitrates and convert a portion of the nitrate oxygen to nitrogen gas at a minimum capital investment. Similarly trickling filter plants which typically remove about 75 percent B.O.D.$_5$ and in some instances oxidize a small portion of the ammonia-nitrogen present to nitrates can be correspondingly upgraded.

I claim:

1. A method for substantially upgrading the pollutant removal capability of wastewater treatment plants that include a primary treatment unit for the removal of settleable and floatable solids from said wastewater; an activated sludge processing tank, a clarifier disposed downstream from said processing tank and conduit means for recirculating solids from said clarifier to said processing tank, said method including the steps of, a. providing a *single stage* biological treatment unit between said processing tank and said clarifier, b. supplying wastewater containing carbonaceous pollutants measured as $BOD_5$ and ammonia nitrogen in a weight ratio of at least about 3.6:1 respectively to said processing tank from said primary treatment unit, c. storing said wastewater in said processing tank, d. supplying said wastewater at a substantially constant predetermined rate from said processing tank to said *single stage* biological treatment unit, e. said biological treatment unit including [not more than a single] *at least one* rotatable shaft supporting a plurality of partially submerged biological contactors having surface area for the growth and maintenance of organisms, f. creating a flow of said wastewater through said biological treatment unit in a direction generally perpendicular to said rotatable shaft *so as to feed the organisms on said contactor surfaces substantially equally,* g. rotating said shaft to impart a predetermined peripheral velocity to said biological contactors to alternately expose said surface area to wastewater and an oxygen containing atmosphere, h. said predetermined rate and peripheral velocity being chosen to simultaneously oxidize at least about 83 weight percent of said $BOD_5$ and at least about 46 weight percent of said ammonia nitrogen on the same surface area of said biological [contacts,] *contactors,* i. said substantially constant predetermined rate being from about 0.4 to about 2.5 gallons/day/sq.ft. of said surface area, and j. inactivating said conduit means to prevent recirculation of solids from said clarifier to said processing tank.

2. The method of claim 1 wherein said peripheral velocity is from about 0.25 to about 1.0 ft./sec.

3. The method according to claim 1 wherein up to about 95 percent by weight of said $BOD_5$ is removed from said wastewater and greater than 46 percent by weight of said nitrogenous pollutants are oxidized in said biological treatment [tank] *unit.*

4. The method of claim 1 wherein said oxygen containing atmosphere comprises from 30 to 60 percent oxygen by volume and said predetermined rate is from about 1 to about 2.5 gallons per day per square foot of said surface area.

5. The method of claim 1 wherein said predetermined rate is from about 0.4 to about 1.5 gallons per day per square foot of said surface area and said peripheral velocity is from about 0.25 to about 1.0 ft./sec.

6. In the method for treating wastewater containing carbonaceous pollutants, expressed in terms of $BOD_5$, and ammonia nitrogen in a weight ratio of at least 3.6:1 respectively to oxidize carbonaceous pollutants and ammonia nitrogen, said method including the steps of removing settleable and floatable solids from said wastewater, supplying said wastewater to a holding tank, storing said wastewater in said holding tank, supplying said wastewater at a predetermined rate from said holding tank to a *single stage* biological treatment unit, and supplying the biologically treated wastewater to a final clarifier to remove suspended solids, the improvement comprising wherein said biological treatment includes [not more than a single] *at least one* rotatable shaft supporting a plurality of partially submerged biological contactors having surface area for the growth and maintenance of organisms, creating a flow of said wastewater through said biological treatment unit in a direction generally perpendicular to said rotatable shaft *so as to feed the organisms on said contactor surfaces substantially equally,* and rotating said shaft to impart a predetermined peripheral velocity to said biological contactors to alternately expose said surface area to said wastewater and an oxygen containing atmosphere, said predetermined rate and peripheral velocity being chosen to simultaneously oxidize at least about 83 weight percent of said $BOD_5$ and at least about 46 weight percent of said ammonia nitrogen, said predetermined rate being from about 0.4 to 1.5 gallons per day per square foot of said surface area.

* * * * *